Patented Feb. 26, 1929.

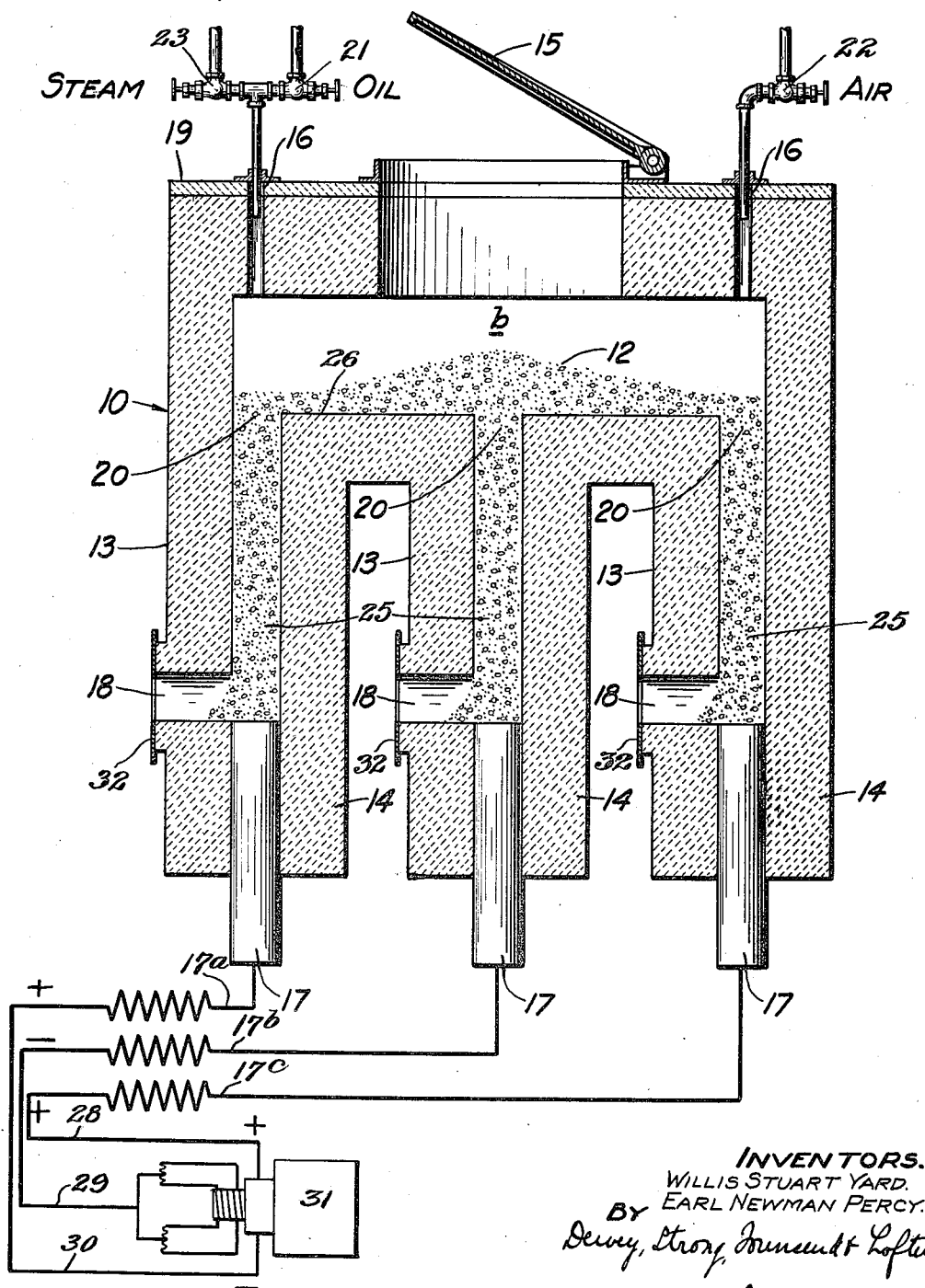

1,703,505

UNITED STATES PATENT OFFICE.

WILLIS S. YARD AND EARL NEWMAN PERCY, OF OAKLAND, CALIFORNIA.

ELECTROTHERMAL GAS PRODUCER.

Application filed February 12, 1924. Serial No. 692,230.

This invention relates to an apparatus for manufacturing gas from hydrocarbon liquids or carbonaceous solids. More specifically, the apparatus is for the generation of gas by the decomposition of oil or of oil and steam or of solid fuels and steam through the medium of electro-thermic action.

The drawing illustrates this apparatus in vertical section.

In localities where crude oil is plentiful or where its use is economically advantageous over coal, it is common to manufacture gas from oil for municipal and other purposes, the gas thus produced being commonly known as oil gas as distinguished from coal gas and water gas, although water gas enters largely into the manufacture of modern oil gas.

A typical oil gas analysis resulting from the present day, well-known type of apparatus for municipal purposes is represented by the following:

Oil used per M cubic feet_____ 7.31 gallons.

Constituents.

|  | Percentages by volume. |
|---|---|
| $CO_2$ | 5.4 |
| $C_6H_6$ | 1.2 |
| $C_nH_{2n}$ | 2.9 |
| $O_2$ | 0.3 |
| $CO$ | 13.2 |
| $H_2$ | 47.5 |
| $CH_4$ | 26.1 |
| $N_2$ | 3.4 |
| Specific gravity | 0.485 |
| B. t. u. (calculated) | 553 |
| B. t. u. (observed) | 550 |

The intermittent process of making gas embodies two antithetical ideas in view of having a heating period and a gas making period. During the heating period the temperature of the apparatus is brought up to the gas making stage, usually of high incandescence, whether the interior work is carbon-coated checkerbrick or other carbon-coated refractory material. When the apparatus is brought up to a sufficient temperature, the apparatus is, of course, filled with products of combustion and it is necessary to arrest combustion and purge the apparatus of these products of combustion before the gas making period is entered upon. The heating period having come to an end, and the apparatus purged of the deleterious products of combustion which, of course, are valueless as an illuminant or as a heating gas, then oil and steam in a well-known manner are introduced into the highly heated apparatus; the steam serving the double function of atomizing the oil and of producing water gas.

The gas from the oil and steam is passed through the apparatus and fixed and thence conveyed through suitable washers and scrubbers to the holders and mains.

In this gas making period the temperature of the apparatus is somewhat reduced, due to the atomization of the liquid oil and the introduction of steam which is of relatively low temperature compared with the interior incandescence of the generator apparatus. As the temperature of the apparatus falls, the gas made changes somewhat both in quality and quantity; the gas being relatively thin or lean while the apparatus is at high temperature and relatively rich or heavier as the temperature falls.

During this period of gas making by the usual intermittent method the generator brick cools somewhat and it becomes necessary to cease the gas making period and again blast the apparatus. In this period of reblasting or reheating and of bringing the interior of the generator up to incandescence, the checkerbrick work is reheated and the apparatus is once more brought up to a condition ready to make gas. This is an intermittent process.

We have aimed to produce an apparatus in which the gas making process may be carried on continuously. This, of course, can only be done by means and the mode of procedure which make it possible to maintain the solid gas-making reagents or elements in the generator at a uniform gas making temperature and at the same time not introduce into the apparatus prohibitive quantities of anything in derogation, or what may be considered a diluent of, a high grade commercial gas.

These desired results are accomplished by the use of a body of electrically heated carbon contained in refractory material that is substantially a non-conductor of electricity. Means are provided for the injection of hydrocarbon liquids and if necessary for the introduction of solid fuel and removal of ash.

Having reference to the accompanying drawings which illustrates this apparatus.

Probably the most important object of our invention is the practical development of a continuous apparatus for making commercial gas from liquid or solid fuels by use of electricity. Most apparatus in practice, and of which we have knowledge, up to the present time is, as already pointed out, intermittent and involves the periodic heating up and cooling down of various parts of the apparatus, different kinds of gases are given off at every instant of operation, and at no time is it possible to maintain an optimum of conditions or to make an optimum quality of gas desired. In our continuous process it is possible to have: economy due to cheap electricity, fixed optimum conditions, increased output, reduced investment, decreased wear, and uniform quality of gas. Specifically we bring about: increased content of methane, decreased content of $CO_2$ and $O_2$, absolute control of constituents, absolute control of calorific value, control of oxygen loss, ability to maintain conditions once established, greater ease and thoroughness in purification, scrubbing and treating because of uniform flow of the gas, substantial elimination of free carbon in the gas, substantial elimination of tar, decrease of physical bulk of gas, and decreased smoke and inert gases.

We have obtained these objects by:

First: a body of granular carbon heated by electricity.

Second: provision for injecting liquid fuel into the solid fuel bed if the use of liquid fuel is the principal intention.

Third: provision for the injection of solid fuel and the removal of ash if the use of solid fuel is the principal intention.

Fourth: provision for admission of liquid fuel. The injection of solid fuel and the removal of ash if it is desirable to use a combination of solid and liquid fuel.

Fifth: provision for the admission of steam or other reagent in any combination with solid and liquid fuel for the purpose of manufacturing the gas to commercial requirements or preventing the plugging up of the generator with carbon deposit or for the formation of water gas or any or all of these provision in combination.

Sixth: provision for the admission of hydrocarbon vapors to the body of electrically heated carbon for the purpose of converting them into fixed gases.

Seventh: devices for controlling temperature of the heated carbon by the control of the electricity and in combination with the heated carbon.

Eighth: device to control temperature of the heated carbon by varying the pressure of the carbon and thus varying the electrical resistance.

Manifestly, variations in practice and apparatus may occur without material departure from the invention or inventions involved.

Our apparatus consists of a circular shell 10 having three legs 13 divided by suitable walls of refractory material 14, or may consist of separate steel-encased legs 13 connected in any suitable manner at the top, so as to permit of the formation of a pancake layer of carbon 12.

Provision is made for the introduction of solid fuel through the door 15. Oil connections 16 maintain a sufficient supply of oil by which the carbon pancake 12 may be continuously replenished and maintained after the apparatus is in operation.

Ash or clinker may be removed if necessary through the opening 18 of the gas offtake.

The legs, 13, are each formed with central vertical openings therein as indicated at 25 in the drawings. These openings communicate at their upper ends with the upper portion of the generator chamber having a bottom, 26, and on to which bottom a mass of finely divided carbonaceous material, 12, is fed. This material also fills the openings, 25, in the legs, 13. In the bottom of the openings, 25, and in the legs, 13, there are electrodes, 17, which form electrical contact with the mass of carbonaceous material and cause electric circuits to be established through the mass of material, 12, within the generating chamber and through the mass of material in the several openings, 25, of the legs, 13. As here shown the various electrodes are connected to conductors $17^a$, $17^b$ and $17^c$, respectively, and the current after passing suitable impedance then travels along wires 28, 29 and 30, which lead to the various poles of a generator set, 31, equipped and wired according to any preferred standard three wire system of power distribution. At the bottoms of the openings, 25, in the legs, 13, there are gas offtake openings, 18, from which gas may be drawn from the apparatus after it has percolated through the masses of carbonaceous material in the openings, 25. It will be understood that these offtake openings may be temporarily covered by suitable covers as indicated at 32 in the drawings, or that they may be suitably connected with pipes which lead to gas receivers or other apparatus.

It is desirable to use di-electric types of refractory material 14 and heat-insulation 19 for two reasons. First: conservation of electrically generated heat is of paramount importance because of its expense. Second: some firebrick and other heat-resisting media become excellent conductors at high temperatures, but are unsuitable for best results in our practice. Ordinary firebrick carefully selected are non-conductors at high temperature and serve our purpose.

The finished gases issue from the offtakes 18 at the bottom of the legs 13 at high temperatures.

Thence they may be carried through certain high temperature purification devices and certain waste-heat devices in order to conserve this heat, although this may not necessarily be a part of our invention: in fact, is recognized gas practice.

In preparing the apparatus for operation it is first filled with carbon fuel 12 which may be pure oil carbon or suitable grades of coal or coke and blasted with air through 22 until fairly free from hydrocarbons and in a condition to act as a satisfactory non-conductor of electricity. This is desirable because the hydrocarbons have an important effect upon the electrical resistance which they increase.

The electricity is then turned on at several hundred volts even nearly a thousand volts according to the condition of the carbon, 12, and its resistance to the carbon is then heated by the electricity to a state of incandescence if not already in that condition from air blasting.

Liquid fuel such as oil is admitted through the connections 16. Provision is made through connections 23 for the admission of steam, and connections 21 are provided for the admission of oil. These reagents may be admitted singly or in combination. The vapors and gases produced will pass down through the body of incandescent carbon where they will become fixed. In addition to the fixing of vapors and heavy gases, reactions take place between steam or oxygen if present, forming other gas such as hydrogen and carbon monoxide and tending to make the carbon porous. At the same time deposition of carbon is taking place by the cracking of the liquid hydrocarbons introduced or vapors from the coal and tending to plug up the generator.

The fundamental principles of the apparatus enable it to use substantially any kind of solid fuel which will conduct electricity, when brought to a state of incandescence. It will do this with solid fuels only in combination with steam or air or oxygen. It will also operate on liquid fuels only by virtue of the carbon deposited from them during gasification. It is necessary, however, to introduce steam, oxygen, or other consuming reagents at the same time to consume the carbon and prevent plugging of the generator or to make provision for removing the necessary amounts of carbon from the bottom of the generator, usually through the same opening that the ash and clinker are removed from 18.

The introduction of air or oxygen causes a partial combustion and generation of heat. The heat reduces the amount of electricity necessary to maintain temperature.

It is also believed that there is an electrolytic or electro-ionic action in the shell 10 as well as the electro-thermic action, because at the higher voltages, arcing takes place between the different granules 20 and the change of quality of gas produced, points sharply to the fact that higher voltages tend to show results in greater ratio than the increase of temperature and due possibly to pure electric action of some kind.

This is also claimed as a feature or function peculiar to this apparatus.

The present invention discloses one form of apparatus for carrying out the method as described and claimed in our Patent No. 1,649,640.

Having thus described our invention, what we claim and desire to secure by Letters Patent is:

1. An apparatus for manufacturing combustible gas from hydrocarbons including a gas generating chamber having a plurality of downwardly extending legs, heating electrodes at the bottom of each leg, an air inlet for admitting air to the generating chamber, oil and steam inlets, also communicating with said chamber, and gas offtakes leading from each of said legs.

2. An apparatus for manufacturing combustible gas from hydrocarbons including a gas generating chamber having a plurality of legs communicating therewith and providing a floor, an air inlet for admitting air to said chamber, steam and oil inlets also communicating with said chamber, heating electrodes in each leg, and means for admitting fuel to said generating chamber and legs to form a layer on the floor of the generating chamber, and gas offtakes leading from each of said legs.

3. An apparatus for manufacturing combustible gas from hydrocarbons including a horizontal gas generating chamber and vertically depending legs communicating therewith, heating electrodes in each leg, an air inlet communicating with the generating chamber for admitting air thereto, oil and steam inlets also communicating with said chamber, a fuel inlet by means of which the legs may be filled with fuel, and a bed of fuel formed in the generating chamber, and offtakes leading from each of said legs.

WILLIS S. YARD.
EARL NEWMAN PERCY.